United States Patent [19]

Grund et al.

[11] 4,221,711
[45] Sep. 9, 1980

[54] BROWN TO VIOLET SUBSTITUTED PHENYL-SUBSTITUTED ANILINO AZO DYES

[75] Inventors: Norbert Grund; Guenter Hansen, both of Ludwigshafen; Wolf-Dieter Kermer, Fussgoenheim, all of Fed. Rep. of Germany

[73] Assignee: BASF Aktiengesellschaft, Ludwigshafen, Fed. Rep. of Germany

[21] Appl. No.: 913,365

[22] Filed: Jun. 7, 1978

[30] Foreign Application Priority Data

Jun. 14, 1977 [DE] Fed. Rep. of Germany ....... 2726656

[51] Int. Cl.² .................. C09B 29/08; C09B 29/26; D06P 1/18; D06P 3/54
[52] U.S. Cl. .................. 260/207.1; 260/207
[58] Field of Search .................. 260/207, 207.1

[56] References Cited

FOREIGN PATENT DOCUMENTS

| | | | |
|---|---|---|---|
| 42/3009 | 2/1967 | Japan | 260/207.1 |
| 43/5672 | 3/1968 | Japan | 260/207.1 |
| 1223137 | 2/1971 | United Kingdom | 260/207.1 |
| 1241705 | 8/1971 | United Kingdom | 260/207 |

Primary Examiner—Floyd D. Higel
Attorney, Agent, or Firm—Oblon, Fisher, Spivak, McClelland & Maier

[57] ABSTRACT

Brown to violet azo dyes of the general formula

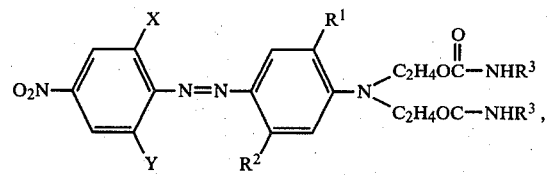

where X and Y are chlorine or bromine, $R^1$ is hydrogen, methyl, ethyl, chlorine, methoxy or ethoxy, $R^2$ is hydrogen, chlorine, bromine, methyl, ethyl, methoxy, ethoxy, $C_{1-4}$ alkanoylamino, benzoylamino or alkoxycarbonylamino, where alkoxy is of 1 to 4 carbon atoms, and the radicals $R^3$ are identical or different, unsubstituted or substituted aliphatic, cycloaliphatic or aromatic radicals. The dyes may be used for dyeing synthetic fibers, especially polyesters, and give very fast dyeings.

1 Claim, No Drawings

BROWN TO VIOLET SUBSTITUTED PHENYL-SUBSTITUTED ANILINO AZO DYES

The present invention relates to dyes of the general formula

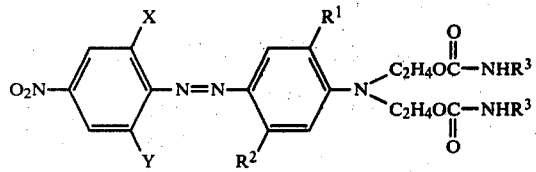

where X and Y are chlorine or bromine, $R^1$ is hydrogen, methyl, ethyl, chlorine, methoxy or ethoxy, $R^2$ is hydrogen, chlorine, bromine, methyl, ethyl, methoxy, ethoxy, alkanoylamino of 1 to 4 carbon atoms, benzoylamino or alkoxycarbonylamino, where alkoxy is of 1 to 4 carbon atoms, and the radicals $R^3$ are identical or different, unsubstituted or substituted aliphatic, cycloaliphatic or aromatic radicals.

Specific examples of radicals $R^2$, in addition to those already mentioned, are formylamino, acetylamino, propionylamino, methoxycarbonylamino, ethoxycarbonylamino and butoxycarbonylamino.

Examples of radicals $R^3$ are alkyl of 1 to 6 carbon atoms, which may be unsubstituted or substituted by chlorine, bromine, hydroxyl or cyano, as well as cyclohexyl, benzyl, phenylethyl, phenyl, chlorophenyl, dichlorophenyl, methylphenyl and dimethylphenyl.

Specific examples are methyl, ethyl, propyl, isopropyl, butyl, isobutyl, pentyl, isopentyl, hexyl, cyclohexyl, phenyl, o-, m- and p-methylphenyl, o-, m- and p-chlorophenyl, 3,4-dichlorophenyl and 3,5-dichlorophenyl.

To manufacture a dye of the formula I, a diazonium compound of an amine of the formula II

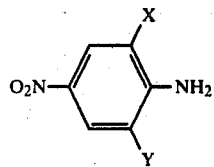

may be reacted with a coupling component of the formula III

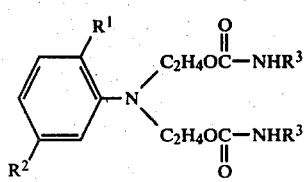

The diazotization and coupling do not exhibit any peculiarities compared to conventional diazotization and coupling reactions and may be effected by conventional processes.

A compound of the formula III can be obtained from a compound of the formula

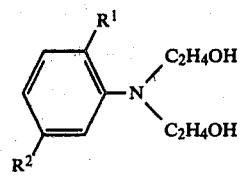

by reaction with the compound of the formula

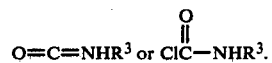

The acylating reactions are advantageously carried out in an aprotic solvent, eg. toluene, dioxane, acetone, methylisobutyl ketone, dimethylformamide or N-methylpyrrolidone. In some cases it is advisable to carry out the reaction in the presence of a base, eg. triethylamine or pyridine.

Particularly important dyes are those of the formula Ia

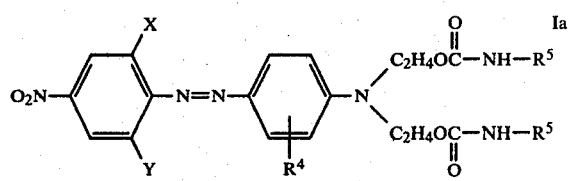

where $R^4$ is hydrogen, methyl or chlorine, $R^5$ is methyl, ethyl, propyl, isopropyl or butyl and X and Y have the stated meanings.

The dyes of the formula I may be used for dyeing synthetic and cellulosic fibers, eg. cellulose acetates, nylons and especially polyesters. The dyeings obtained have good fastness to light, wet treatments and thermofixation.

Some of the dyes are also suitable for the process described in German Pat. No. 1,811,796.

In the Examples which follow, parts and percentages are by weight, unless stated otherwise.

EXAMPLE 1

10.4 parts of 2,6-dichloro-4-nitroaniline are dissolved in 50 parts by weight of 85% strength sulfuric acid and diazotized at 0°-5° C. with 16 parts of 45% strength nitrosylsulfuric acid. After 5 hours, the diazo solution obtained is added, at 0°-5° C., to a solution of 16.5 parts of N,N-bis-(methylcarbamoyloxyethyl)-m-chloroaniline in 30 parts of dimethylformamide, 40 parts of concentrated hydrochloric acid, 250 parts of water and 250 parts of ice. After completion of coupling, the mixture is heated to 70° C. and the product is filtered off, washed neutral with water and dried under reduced pressure at 70° C. 25 parts of the dye of the formula

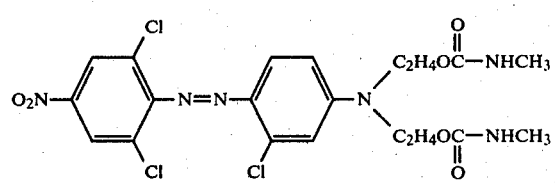

are obtained; on polyester fibers, this dye gives intense brown dyeings of excellent fastness.

EXAMPLE 2

20.7 parts of 2,6-dichloro-4-nitroaniline are dissolved in 100 parts of 85% strength sulfuric acid and are diazotized at 0°–5° C. with 32.5 parts of 45% strength nitrosylsulfuric acid, after which the mixture is stirred for 3.5 hours at 3°–8° C.

39.3 parts of N,N-bis-(n-butylcarbamoyloxyethyl)-m-toluidine are dissolved in 200 parts of hot glacial acetic acid and the solution is added to a mixture of 400 parts of water, 80 parts of concentrated hydrochloric acid, one part of amidosulfonic acid and 600 parts of ice. The diazonium salt solution is then run in at 0°–5° C. After completion of coupling, the dye is filtered off, washed neutral with water and dried under reduced pressure at 50° C. 57 parts of the dye of the formula

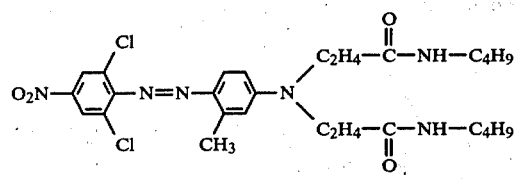

are obtained; on polyester fibers, this dye gives deep reddish brown dyeings of very good fastness, in particular good lightfastness, fastness to thermofixation and to perspiration.

EXAMPLE 3

29.6 parts of 2,6-dibromo-4-nitroaniline are diazotized with 32.5 parts of 45% strength nitrosylsulfuric acid by the method described in Example 2.

18 parts of N,N-bis-(isopropylcarbamolyoxyethyl)-aniline are dissolved by heating with 100 parts of N-methylpyrrolidone. Using the method described in Example 2, the solution is added to a mixture of water, ice and hydrchloric acid and is then coupled by adding the diazonium salt solution. After working up as described in Example 2, 63 parts of the dye of the formula

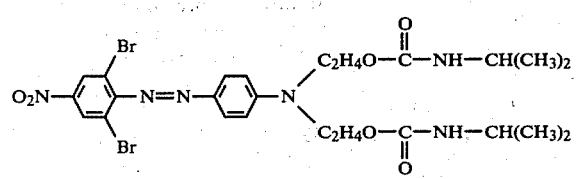

are obtained; on polyester fibers, this dye gives deep brown dyeings with very good lightfastness, fastness to thermofixation and fastness to perspiration.

The dyes characterized, in the Table which follows, by indicating their substituents are also obtained by a similar method.

| Example | X | Y | $R^1$ | $R^2$ | $R^3$ | Hue |
| --- | --- | --- | --- | --- | --- | --- |
| 4 | Br | Cl | $CH_3$ | H | $C_2H_5$ | reddish brown |
| 5 | Br | Br | H | $CH_3$ | cyclohexyl–H | reddish brown |
| 6 | Cl | Cl | H | $CH_3$ | $CH_3$ | reddish brown |
| 7 | Cl | Cl | H | Cl | phenyl | brown |
| 8 | Br | Br | H | Cl | $C_4H_9$ | brown |
| 9 | Br | Cl | H | $NHC(=O)-C_2H_5$ | " | brownish violet |
| 10 | Cl | Cl | $OCH_3$ | $NHC(=O)-CH_3$ | $CH_3$ | violet |
| 11 | Cl | Cl | H | H | " | brown |
| 12 | Br | Cl | H | Cl | " | " |
| 13 | Cl | Cl | H | $OCH_3$ | " | reddish brown |
| 14 | Br | Br | H | H | $C_4H_9$ | brown |
| 15 | Br | Br | H | Cl | $CH_3$ | " |
| 16 | Cl | Cl | H | H | $-CH(CH_3)_2$ | " |
| 17 | Cl | Cl | H | Cl | $C_2H_5$ | " |
| 18 | Cl | Cl | H | $CH_3$ | $-CH(CH_3)_2$ | reddish brown |
| 19 | Br | Cl | H | $CH_3$ | $CH_3$ | reddish brown |
| 20 | Br | Br | H | $CH_3$ | $CH_3$ | reddish brown |
| 21 | Br | Cl | H | $CH_3$ | $C_4H_9$ | reddish brown |
| 22 | Br | Br | H | $CH_3$ | $C_2H_5$ | reddish brown |

We claim:
1. A brown to violet colored azo dye of the formula:

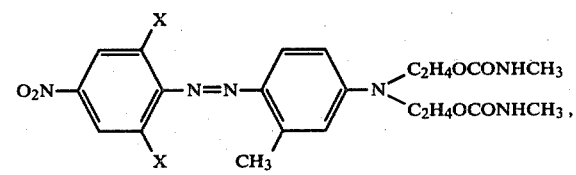

wherein X is chlorine or bromine.